United States Patent

[11] 3,534,655

| [72] | Inventors | Ernst J. Hunkeler<br>Fairport;<br>William G. Buchanan; Richard S. Buxton, Rochester, New York |
|---|---|---|
| [21] | Appl. No. | 764,213 |
| [22] | Filed | Oct. 1, 1968 |
| [45] | Patented | Oct. 20, 1970 |
| [73] | Assignee | The Gleason Works<br>Rochester, New York<br>a corporation of New York |

[54] CONTROL ARRANGEMENTS FOR BEVEL GEAR MAKING MACHINES
36 Claims, 9 Drawing Figs.

| [52] | U.S. Cl. | 90/5 |
| [51] | Int. Cl. | B23f 9/10 |
| [50] | Field of Search | 90/5, 6, 9.4, 3; 51/95 |

[56] References Cited
UNITED STATES PATENTS

| 2,725,792 | 12/1955 | Wildhaber | 90/5 |
| 3,213,756 | 10/1965 | Ash | 90/5 |
| 3,288,031 | 11/1966 | Krastel et al. | 90/5 |
| 2,999,429 | 9/1961 | Carlsen | 90/6 |

Primary Examiner—Gil Weidenfeld
Attorneys—Cushman, Darby and Cushman and Morton A. Polster ABSTRACT: Gear-generating machine operation is controlled by a small, easily accessible cam driven by an independent power source and operatively connected to the machine's generating train by a servomechanism. The generating train is designed to be reversingly driven by its own power source, and the servomechanism regulates operation of the latter power source through a differential connection to effectuate the desired control of machine operations.

The apparatus includes a novel roll-centering device whereby the position of machine parts can be accurately predetermined and realized for each successive cutting cycle so that the cutting operation of each cycle will be initiated with the cutter and work in their proper positions relative to each other.

INVENTORS
ERNST J. HUNKELER
WILLIAM G. BUCHANAN
RICHARD S. BUXTON

BY
Cushman Darby & Cushman
ATTORNEYS

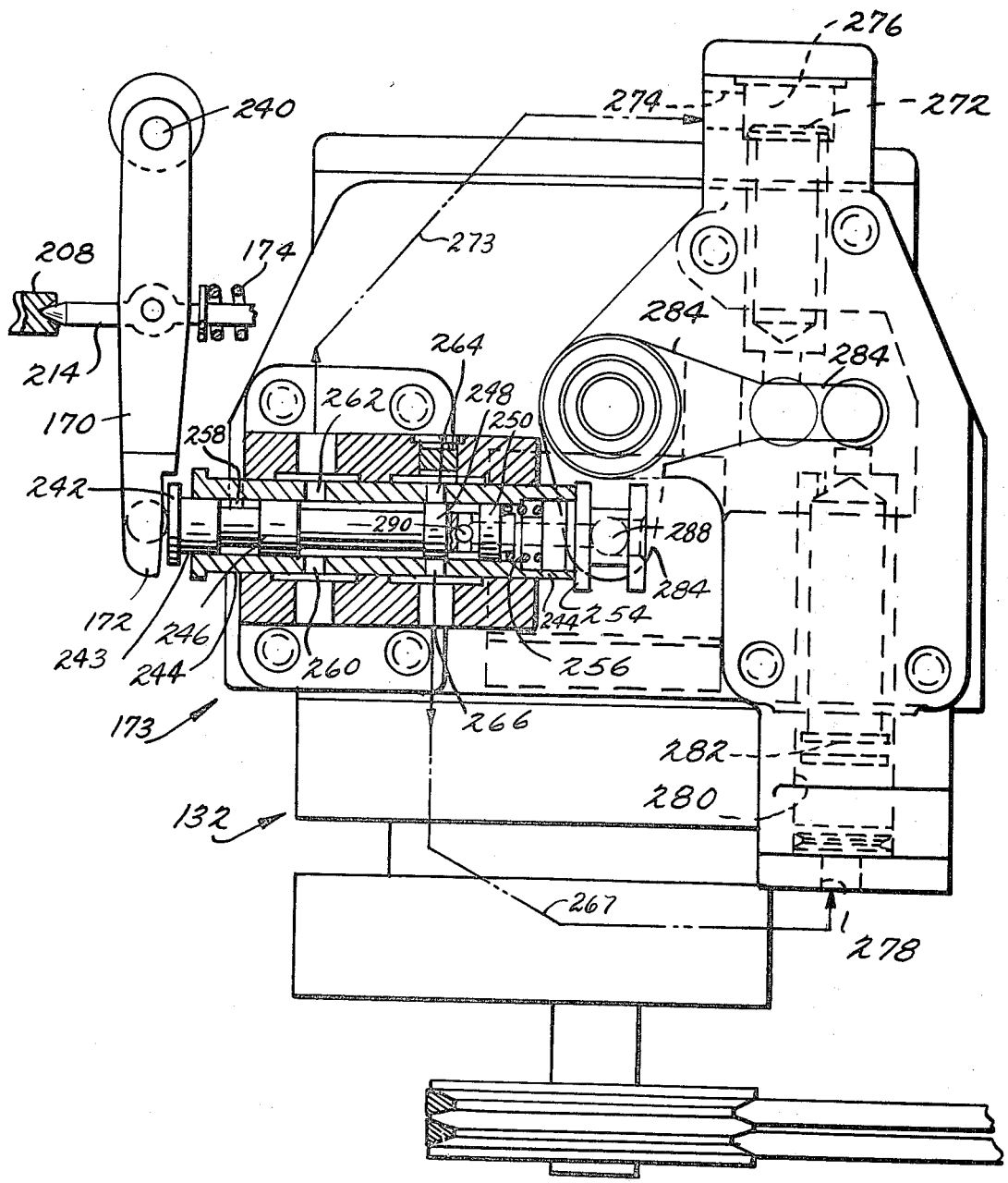

INVENTORS
ERNST J. HUNKELER
WILLIAM G. BUCHANAN
RICHARD S. BUXTON
BY Cushman, Darby & Cushman
ATTORNEYS 3,534,655

1

CONTROL ARRANGEMENTS FOR BEVEL GEAR MAKING MACHINES

BACKGROUND AND OBJECTS

The present invention relates to gear-making apparatus and particularly to machines for making bevel gears.

The present invention is part of an overall, general development of the Gleason Works which includes several inventions besides that disclosed and claimed herein. This development includes other inventions such as a novel cradle housing and cradle assembly, a novel ratio control or ratio change mechanism, novel control means for the generating train, a novel workhead assembly and mounting, novel means for conveying gears or gear blanks to the cutting stations and transferring them between cutting stations with novel means for automatic stock division in going from one station to the other, a novel control means for controlling the operation of the work loading and unloading and automatic stock division mechanisms, a novel chamfering means designed to remove burrs, etc. from the roughed gears, novel cutter-truing techniques and structures, and other novel structures and techniques, all of which are being covered in a series of 11 patent applications. These applications are Ser. Nos. 764,212 through 764,222, consecutively, filed of even date herewith, and the disclosures of which are all incorporated herein by reference.

While the present development relates especially to the production of bevel pinion gears for the automotive industry, for example, spiral bevel or hypoid gears, it will be apparent to those skilled in the art that features of the development may be used in machines for making other types of gears, and for industries other than the automotive industry.

In typical previous machines, the means for controlling the operation of the generating train include a large barrel cam (e.g., as disclosed in U.S. Pat. No. 2,667,818) which is extremely difficult to replace (in the event one wishes to change generating motions) and expensive to manufacture, and in all known prior art machines the control means is actually driven by the same power source that drives the generating train. The present invention provides important improvements over such prior art machines in that the control means comprises a servomechanism differentially interconnecting the generating train with a relatively small, easily replaced, and more economical control cam which is driven by its own separate power source. In addition to the more obvious advantages of efficiency and economy, the use of a separate power source enables the generating train to accommodate faster cutting cycles, thereby providing increased machine production.

It is a primary general object of the present invention to provide bevel gear making apparatus with novel structures constituting control means for the generating train in a bevel gear-making machine. In the illustrative embodiment of the invention, this control means is in the form of a servomechanism having its own power source separate from the power source for the generating train.

It is a further object of the invention to provide a novel structural arrangement for this servomechanism and its operative connections to the generating train so as to provide an improved construction wherein, among other things, the generating train may be conveniently operated at higher speeds so as to accomplish the generating rolls in less time, and thereby reduce the time of the cutting cycle. A related feature resides in the provision of a separate power source for the cutting tool, whereby cutter rotation will be divorced from the generating train so that the cutter may be operated at faster speeds, as desired, without the need for any mechanical connections to the generating train.

In the illustrative embodiment of the servomechanism, referred to, there is provided a differential-type connection between the generating train and the servomechanism providing for an efficient and improved control of the reversible operation of the generating train and at variable speeds. The power source for the generating train will be designed to rotate the generating train in both directions and at variable speeds, with the differential connection of the servomechanism operating to control the generating train's power source.

It is a further object of the present invention to provide a novel roll-centering means in combination with the control means for the generating train so as to assure that the parts will be in certain predetermined positions at the end of a cutting cycle, thus guaranteeing that the next cutting cycle will begin with the cutter and work in the proper positions. In the illustrative embodiment of this feature of the invention, the roll-centering device is operatively connected to the differential in the servomechanism so as to result in a further actuation of the generating train, as desired, to bring the tool and work holders to the desired and proper positions for the next cutting operation.

A further object of the invention resides in the provision of a novel safety device, in the form of a relief valve construction, for operation in conjunction with the roll-centering device.

Further objects and advantages of the invention will be in part obvious and in part pointed out hereinafter.

The novel features of the invention may be best made clear from the following description and accompanying drawings in which:

FIG. 7 is an enlarged, fragmentary, and partially sectioned view of part of the valve system for controlling the operation of the fluid pump and motor for the generating train;

Figure 9:
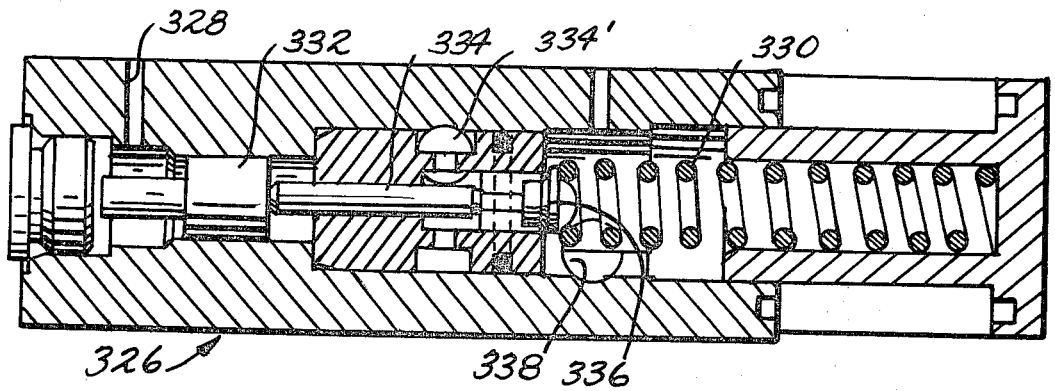
Figure 8:
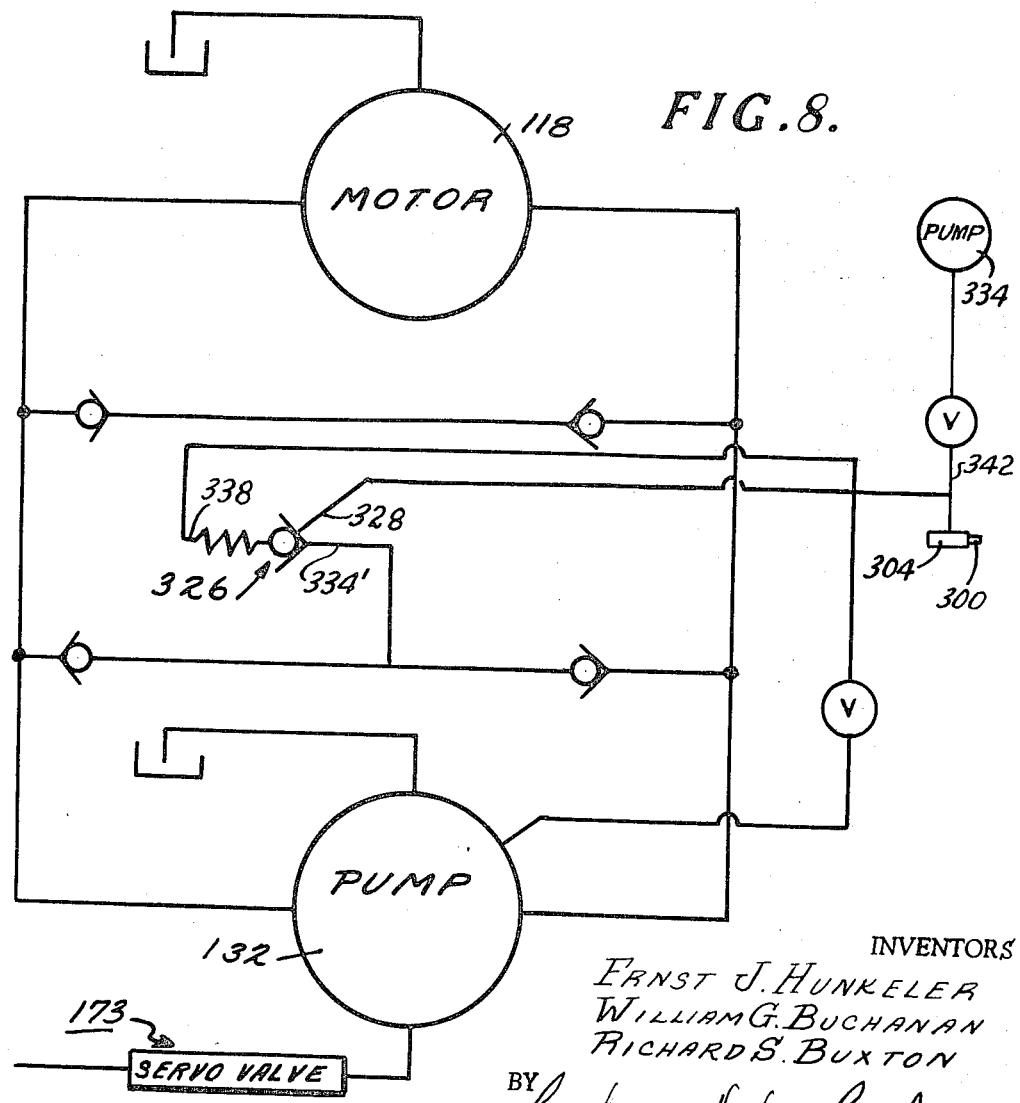

FIG. 8 is a schematic view showing an illustrative and conventional flow diagram for the pump and motor for driving the generating train; and FIG. 9 is an enlarged sectional view of a conventional relief valve designed to embody a novel structure providing for pressure relief at certain desired times in the gear-cutting cycle, and at pressures below the venting pressure for which the valve was originally designed.

Figure 1:
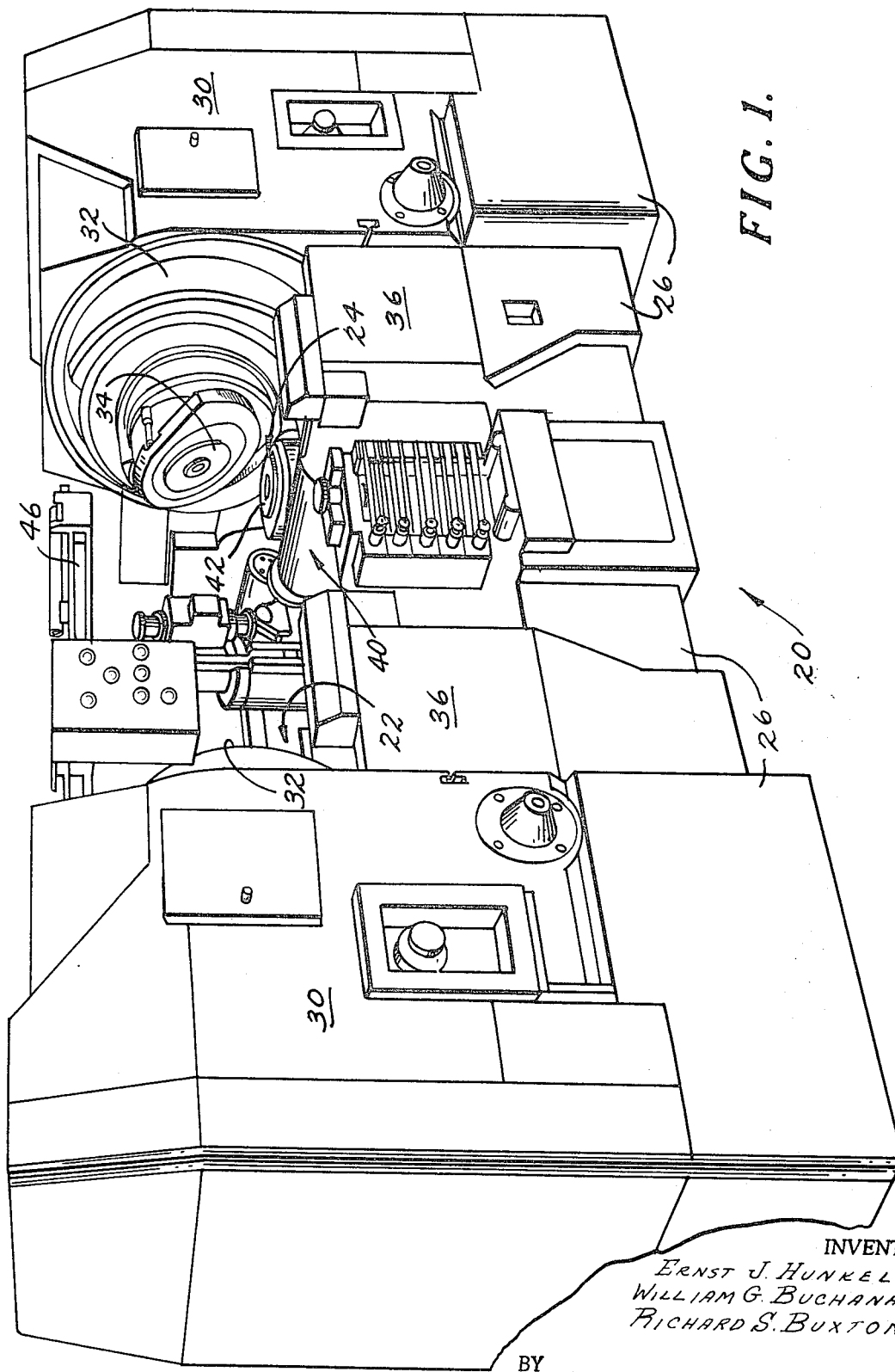
FIG. 1 is a perspective view of a double machine illustrative of the present development referred to above.

Referring now to the drawings, FIG. 1 illustrates a double gear-cutting machine 20, embodying the present development. This machine is a double finishing machine wherein each of the cutting stations does a finishing operation. However, it will be understood that a double roughing machine embodying this development may have a similar external appearance and the same basic design characteristics but with certain structural modifications adapting it for roughing rather than finishing, as will be understood to those skilled in the art, and as will be apparent from the series of applications, referred to above, filed contemporaneously herewith. As disclosed in the copending application Ser. No. 764,212, the double machine includes two cutting stations 22, 24 mounted on a frame 26, and each cutting station includes a cradle housing 30, containing the cradle 32 and tool holder 34, mounted for adjustable movement on the base frame. The tool holder 34 is mounted for rotation within the cradle 32 and about a generally horizontal axis which may be adjusted within a certain range or ranges of positions as will be understood. The tool holder is designed to mount a rotary face mill cutter, and the rotary tool holder, face mill cutter and adjustable means in the cradle for adjusting the position and angle of the face mill cutter and rotary tool holder may be conventional as disclosed, for example, in the U.S. Pat. No. 2,667,818.

The machine 20 includes upstanding flanges or side walls 36 suitably mounted on the frame and extending upwardly therefrom, as shown in FIG. 1. A workhead assembly 40 is mounted between these side wall members and includes a rotatable work holder 42 mounted therein and designed to receive the work that is to be cut so that the work is rotatable about a vertical or generally vertical axis, as is disclosed in the copending application Ser. No. 764,221.

As indicated in the copending application Ser. No 764,212, the present development contemplates that a single machine having a single cutting station may be provided, or a double machine may be provided, or two double machines may be provided, all involving the principles and novel features of the overall development as will be evident. The novel structures of the present invention, including the novel control means for the generating train, and related structures, will now be described with reference to a generating train designed to be utilized with a single cutting station or two cutting stations in a double machine of the type illustrated in FIG. 1 and disclosed in the copending application Ser. No. 764,212.

THE DRIVING ARRANGEMENT

It will be understood that in generation of bevel gears, such as spiral bevel or hypoid gears, there commonly are two basic elements, the cradle and the work spindle, both of these being located in a certain spaced relationship with one another and rotating in a predetermined timed relationship on their respective axes. Conventionally, the cradle carries a rotating, multibladed face mill cutter (not shown) whose axis is in adjustable but stationary position relative to the cradle, offset from and generally inclined to the axis of the cradle on which it is mounted. The cradle and cutter mounted thereupon represent the imaginary "generating gear," as is understood, and the rotating cutter blade edges represent a tooth of this imaginary "generating gear." The work spindle carries the work being cut; the cradle carrying the cutter rotates about the cradle axis in timed relation to the rotation of the work spindle with the rotating cutter in engagement with the work. Thus the imaginary "generating gear" is said to roll with the workpiece.

The roll proceeds sufficiently to complete the generation of one tooth slot (or in some cutting operations, one side of one previously roughed tooth slot), whereupon there is a withdrawal so that the cradle with its cutter and the work are relatively separated one from the other in the direction of the cradle axis. The rolling motion of both cradle and work spindle is reversed during which time an increment of motion is added to the work spindle such as to advance (index) the work relative to the cradle by one pitch. At the completion of the reversal of roll, called the return roll, relative cradle axial movement between cradle and work again occurs to bring the two into cutting position, whereupon a cycle is repeated to cut the following tooth. It will be understood that, if desired for certain cutting operations, a cutting action could be provided on the return roll, after which the cutter and work will be relatively withdrawn, and the work indexed for the next tooth-cutting cycle.

THE GENERATING TRAIN

The generating train of the machine, as will be understood, is the complete connection between the cradle and work spindle for controlling the relative generating rotation of these two members. The illustrative embodiment of the generating train shown in FIGS. 2 and 3 will be now be traced. A worm gear 52 is fixed rotationally to the cradle 32, and this gear is engaged by a worm 54 connected to a telescoping shaft 56 on which is mounted a change gear 58. This is the point in the train where there is introduced a set of four change gears, a selection of which governs the ratio of generating roll between the cradle and work. Continuing through this latter set of change gears 60, 62, 64 through shaft 66, there is a connection to a suitable index differential gearing 68. Except during the indexing interval, which will be referred to again hereinbelow, the index differential 68 can be regarded as a simple train of gearing with gear 70 meshing with gear 72 which is rigidly connected to gear 74 meshing with a gear therebelow rigidly connected to gear 76 which in turn meshes with gear 78, as shown. Gear 78 is rigidly connected to or integral with bevel gear 80, in turn meshing with bevel gear 82 connected to shaft 84.

Shaft 84 is keyed for rotation to another bevel gear 86 engaging with a mating gear 88 fastened to a shaft 90 which is connected for rotation to a pinion 92 of a hypoid pair. The meshing hypoid gear 94 is rigidly connected to the work spindle. As will be understood, the work spindle is connected for rotation in the workhead assembly 40. This completes the trace of the generating train, that is, the gearing which links and controls the relative rotational motion of cradle and work during the generating rolls. It will be understood that this generating train will be capable of being rotated in either direction, for the forward and return rolls.

THE INDEXING MECHANISM

A suitable indexing mechanism 96 will be provided, and in this connection, reference is made to U.S. Pat. Nos. 3,229,552, and 3,283,660, the disclosure of which is incorporated herein by reference. The teachings of those patents indicate suitable indexing mechanisms that may be utilized in part in connection with the generating train, in the present invention. In an indexing step, the cradle 32 may be considered as fixed against rotation, and likewise cradle gear 52, worm 54 and related elements of the generating train, as will be evident. In the operation of the index 96, an index rack 98 will be moved in a direction perpendicular to the plane of the diagram in FIG. 5 and through a fixed distance by a suitable hydraulic piston (not shown). The rack 98 engages a pinion 100 which is made to turn exactly one revolution as a result of the controlled distance of rack travel. Pinion 100 drives a gear 102 through an axially engageable and disengageable one tooth clutch 104. During the forward or indexing stroke of the rack, clutch 104 is held in engagement by hydraulic pressure in cylinder 105, as will be understood. One turn of gear 102 produces a corresponding single turn of mating gear 106, which produces one turn of the coaxial and connected change gear 108. During the indexing motion of gears 106 and 108, a locking pawl 110 is made to disengage from a notch in a locking disk 112 connected to and corotatable with the gears 106 and 108. At the completion of the one turn, the locking pawl is made to reengage disk 112.

The change gear ratio 108, 114 is so chosen that an appropriate rotational increment is produced in the gear 114, producing in turn the identical increment in the connected differential spider 116. Spider 116 carries the differential pinions around the stationary gear 70. The action of the differential is such as to produce a turning of gear 78 relative to gear 70, equal to exactly twice the turning increment of the spider 116. The appropriate rotational increment in gear 114, controlled by the index change gear selection, must be such that the amount of turning of differential gear 78 relative to differential gear 70 will produce, by way of generating train elements 78 through 94, an increment of work spindle turning relative to the fixed cradle equal to one pitch of the work.

It will be recalled that for the purpose of explaining the function of the indexing mechanism, the cradle was considered as fixed rotationally. In actual operation, however, the indexing can be made to occur while the cradle is turning as, for example, during the noncutting portion or return roll of the cycle. The increment of index rotation produced in the work relative to the cradle is the same.

At the completion of one indexing step, hydraulic pressure in cylinder 105 will be released permitting disengagement of clutch 104 and the rack 98 and pinion 100 will be returned to their original position, before the clutch is reengaged.

THE DRIVE FOR THE GENERATING TRAIN

Figure 5:
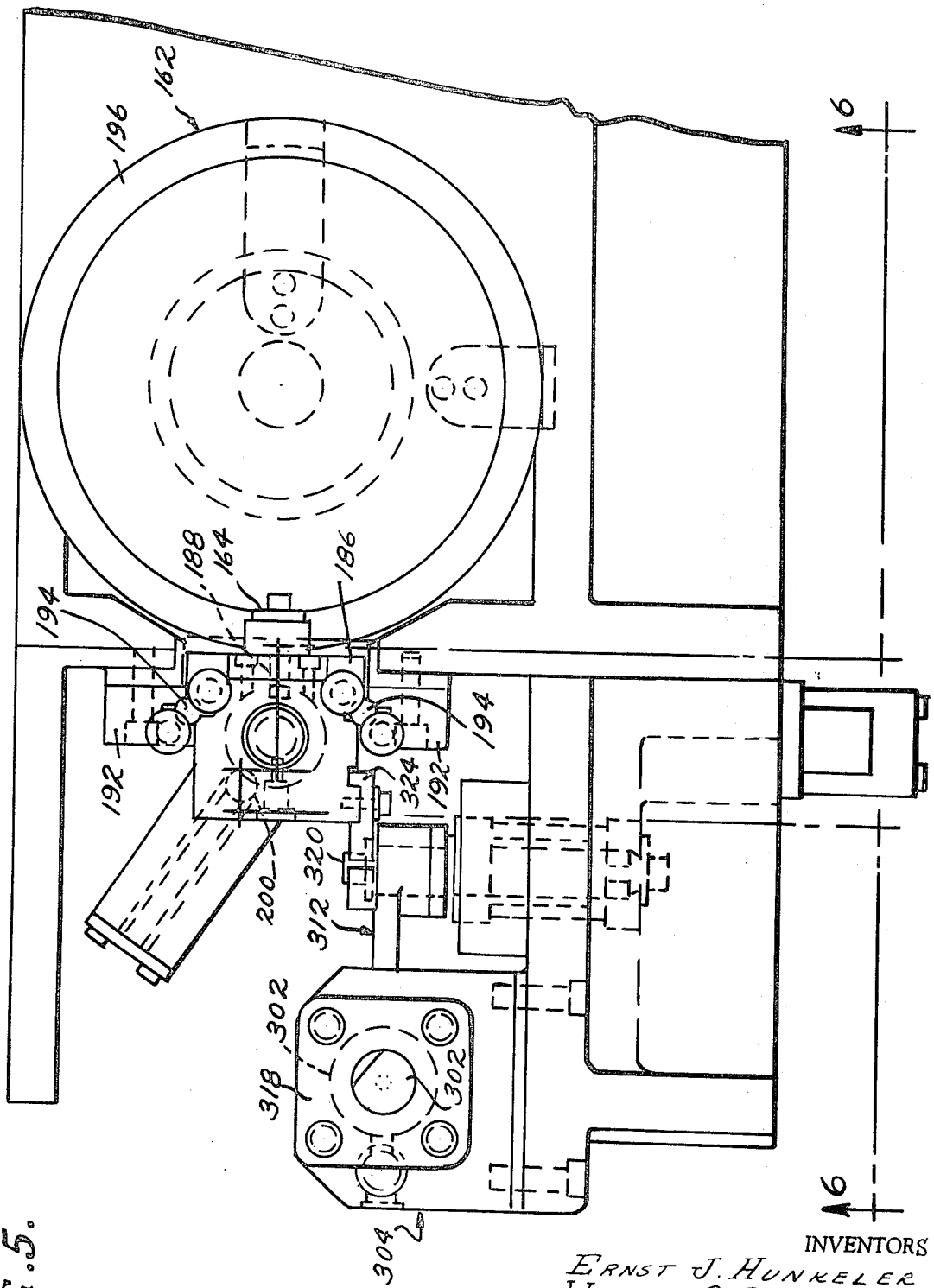
FIG. 5 is an enlarged view of the structure shown in FIG. 4 and viewed in the direction of the arrows 5–5 in that FIG.
Figure 6:
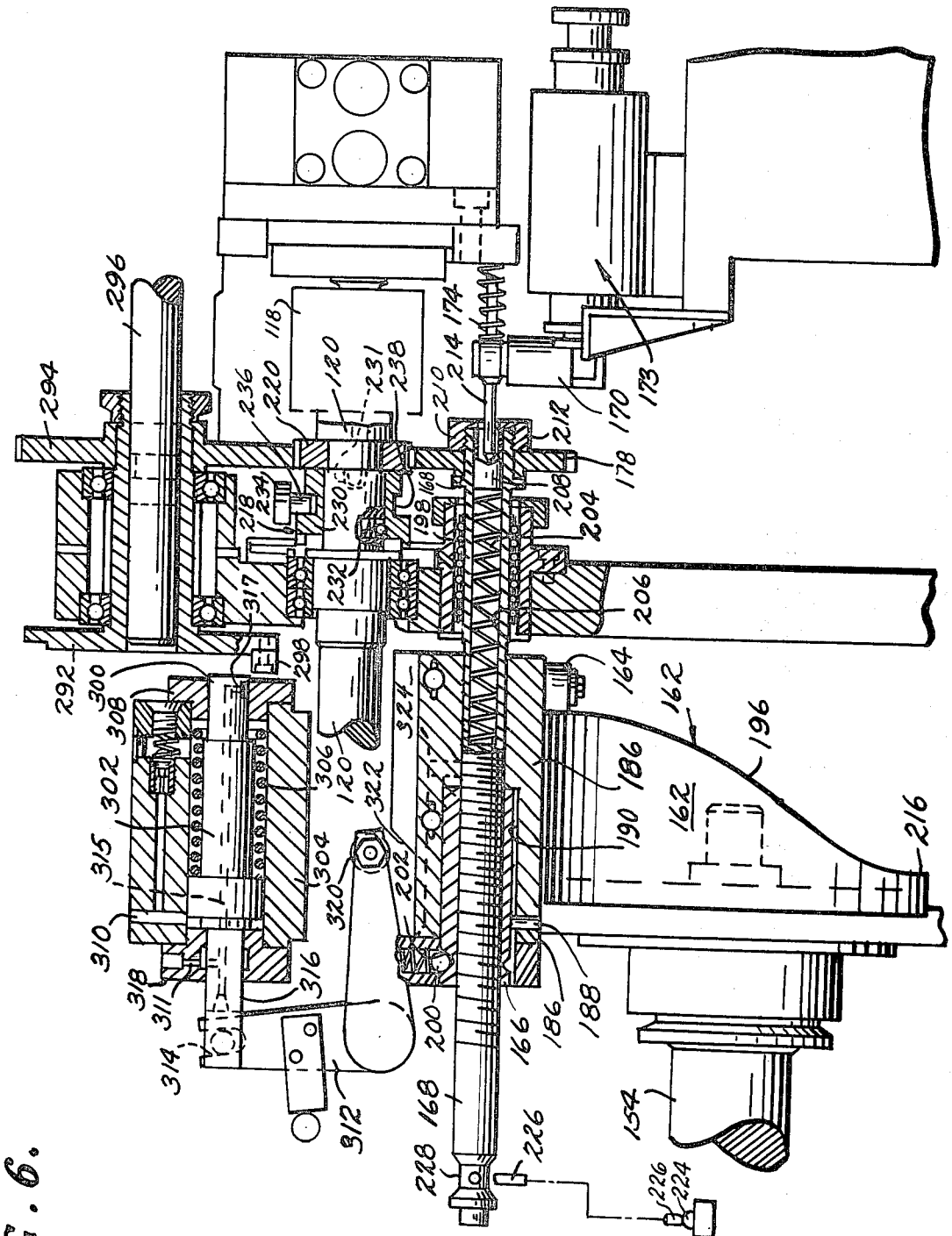
FIG. 6 is a sectional view of the structure shown in FIG. 5 and taken along line 6–6 thereof.

As shown in FIGS. 5 and 6, the drive for the generating train includes a reversible hydraulic motor 118, driving through shaft 120 and roll change gears 122, 124 and fixed gearing 126, 128, the latter gear being rigidly attached to shaft 66 in the generating train. A controllable displacement, hydraulic pump 132 is shown as being connected to the hydraulic motor for controlled and reversible driving actuation thereof in conventional manner. The pump 132, in turn, is driven by a motor 134, which in the illustrative embodiment is a constant speed electric motor. The electric motor 134, hydraulic pump 132, and hydraulic motor 118 and the various driving connections therefore may all be of conventional design.

THE CUTTER DRIVE

Figure 2:
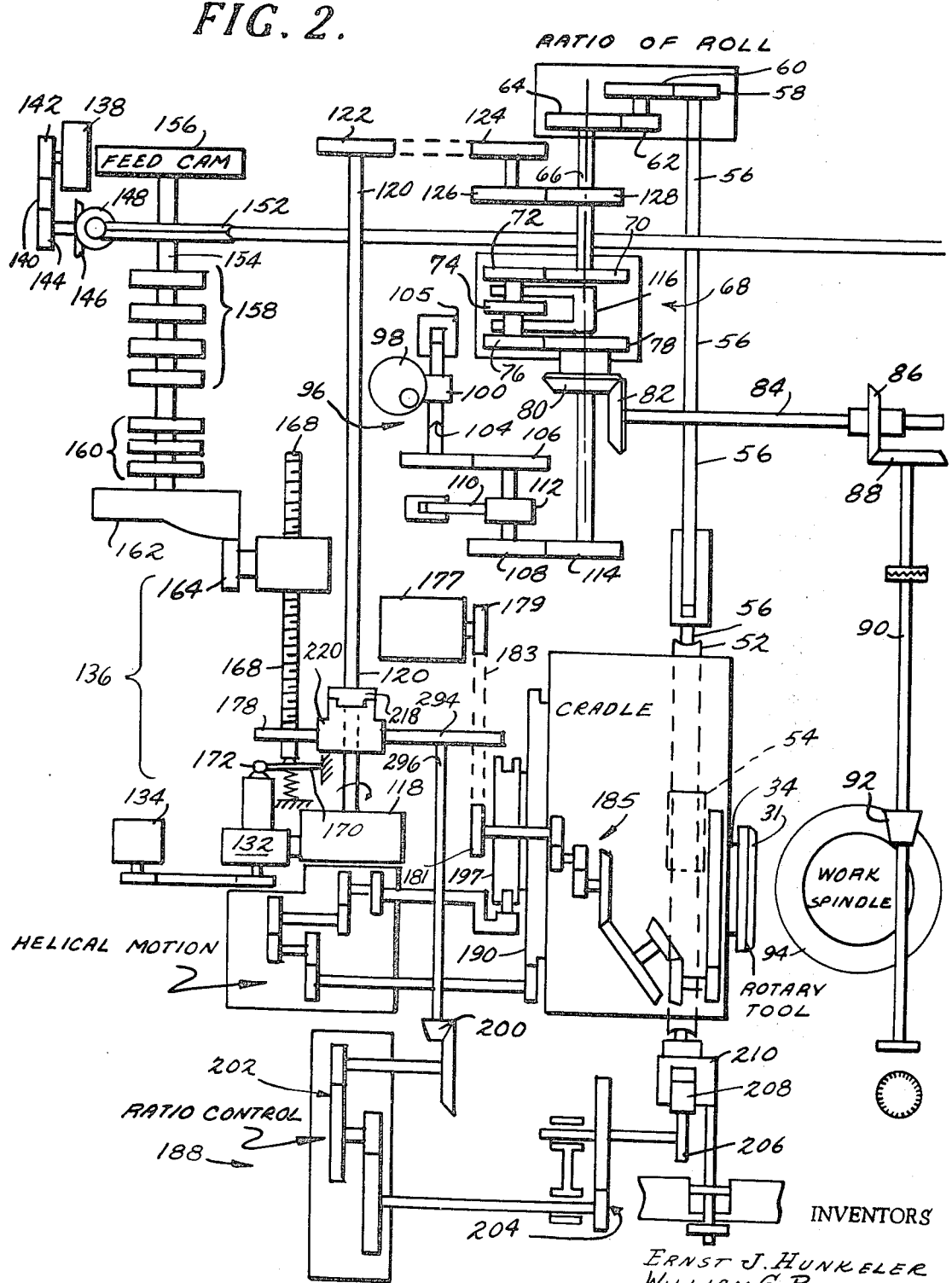
FIG. 2 is a somewhat schematic and diagrammatic view of a generating train, control means therefore, and cutter drive, embodying the invention.
Figure 3:
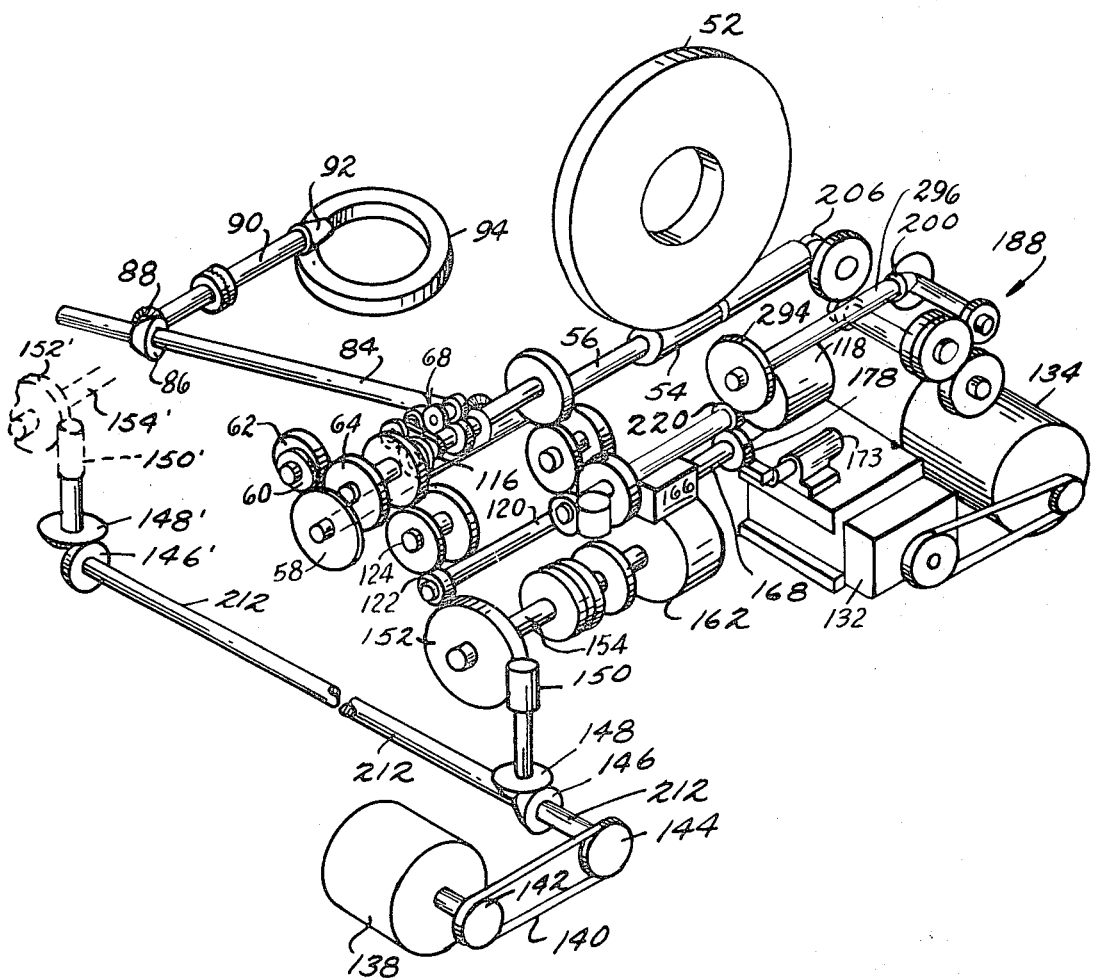
FIG. 3 is a somewhat schematic, isometric view of the generating train and control mechanism of FIG. 2.

The cutting tool, tool holder 34, and the cutter drive train are shown in FIG. 2 as driven by a separate power source, for example, an electric motor 177, through speed change pulleys 179, 181 and belt 183, and a train of gearing 185 within the cradle. This gearing may be of conventional design as disclosed, for example, in U.S. Pat. Nos. 2,667,818 and 3,288,031.

CONTROL SYSTEM FOR THE DRIVE TRAIN

The illustrative embodiment of the novel control system of the invention, as best seen in FIGS 2—6 includes a servomechanism 136, comprising a variable speed DC motor 138 driving through belt 140 and pulleys 142, 144, and through right angle gearing 146, 148 to a worm 150 which in turn is drivingly engaged to a worm wheel 152. The worm wheel 152 is shown fixed to and rotatable with the main cam shaft 154 which is suitably mounted for rotation in a feed cam bracket (not shown) rigidly attached to the machine frame. The feed cam shaft 154 carries the feed cam 156, various hydraulic 158 and electrical 160 trip cams (for various purposes, such as producing appropriate timing for such functions as hydraulic pressure and release to the indexing mechanism, ratio control and various setovers as will be understood).

A rise end cam, called a roll cam 162, is also driven by the cam shaft 154, as shown in FIGS. 2, 3, 5, and 6. The variable speed motor 138 will be adjusted to regulate the cycle time of the entire machine, as desired. In the present illustrative embodiment of the invention, one turn of the main cam shaft 154 will produce one tooth-cutting cycle.

A roll cam follower roller 164 is suitably operatively connected to a nut 166 of a nut and screw 168 assembly, constituting a differential connection between roll cam 162 and the generating train, as will become apparent. The nut will be constrained against rotation, but is free to translate and move axially. The screw 168 is free to translate axially and to rotate within the nonrotating nut 166, and one end of the screw 168, the lower end as viewed in FIG. 2, is shown as operatively engaged to a pivoted lever 170, the free end 172 of which is arranged to actuate a hydraulic control valve system 173 of conventional design and as will be described in more detail hereinbelow. This control valve system includes a wobble plate valve (not shown) designed to govern and control both the direction and the flow rate of the discharge of the fluid or liquid pump to the hydraulic motor, and this establishes the direction and rate of motor rotation, as is understood. The operative fluid utilized in the pump and motor drive may be oil.

Figure 4:
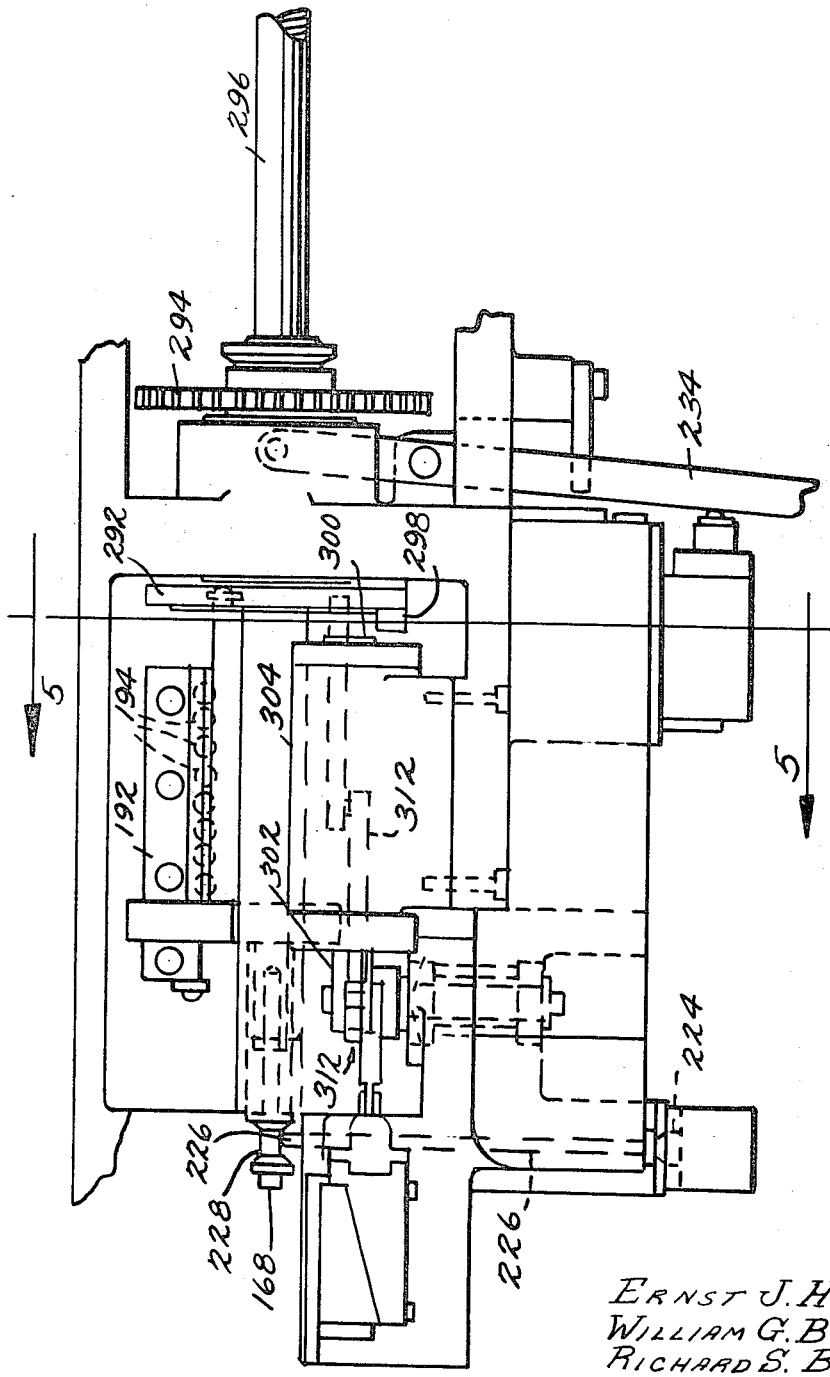
FIG. 4 is an enlarged and partially fragmentary view of certain parts of the control means and associated structure embodying the invention.

Referring now to FIGS. 4—6, it will be noted that the nut 166 and screw 168 are mounted in a slide 186 which is arranged for axial or straight-line motion, and includes at the left-hand end shown in FIG. 6 a recess containing the nut 166. Suitable structure will be provided to keep the nut from rotating in the slide. For example, a pin 188 and slot 190 arrangement may be provided, as shown in FIG. 6.

The slide 186 is suitably connected or attached in sliding engagement to the machine frame, as indicated, for example, by guides 192 and balls 194 shown in FIG. 5, so as to permit reciprocation of the slide back and forth or from left to right and right to left as viewed in FIG. 6. The cam follower roller 164 is shown in FIG. 6 as being engaged or connected to the slide 186 and it engages the cam surface 196 on the roll cam 162 as indicated.

As best seen in FIG. 6, the screw 168 is threaded at the left-hand end thereof for engagement with the nut 166 and is externally smooth or unthreaded at the right-hand end, where it is journaled in a suitable bearing 198 mounted in the machine, as shown. The nut 166 is held in the slide 186 by suitable means, such as a ball detent 200 located at the left-hand end of the slide, as viewed in FIG. 6, and spring urged into an annular recess 202 in the nut 166 as shown, thus also effecting a driving connection between the slide 186 and nut 166 for straight-line or axial movement in the direction of the screw axis.

A spring 204 is shown arranged in a bore 206 in the right-hand end of the screw 168, and will normally be held in a substantially, but not completely compressed condition by the shoe 208 and bushing 210, held in the bore 206 by the nut 212 suitably fastened or threaded onto the right-hand end of the screw 168, as shown. The pivoted lever 170 is designed to be operated by an actuator 214, continuously urged by spring 174 against the shoe 208, and suitably connected to the pivoted lever 170 to actuate the latter during operation, as best seen in FIG. 7. The spring 174 will urge the screw 168, nut 166 and slide 186 continuously to the left, as viewed in FIG. 6, so as to continuously urge the follower 164 into engagement with the roll cam 162. The arrangement of the spring 204 and shoe 208 in the screw 168 provides a safety feature which will become apparent as the description proceeds.

When the cam 162 rotates from the position shown in FIG. 6, the follower 164, nut 166, screw 168 and actuator 214 will tend to move to the left as viewed in FIG. 6, under the action of the spring 174. Thus the solid line position of the slide, and follower 164 shown in FIG. 6 constitutes the normal right-hand end of the movement of the screw and nut assembly. As the roll cam 162 continues to rotate, the spring 174 will urge the nut and screw differential assembly to the left, as viewed in FIG. 6, and the left-hand end of that movement will be defined when the follower 164 engages on the dwell at the lowest point 216 of the cam surface 196. Movement of the nut and screw assembly from the left to the right, as viewed in FIG. 6, will result in an actuation of the valve 173 through the actuator 214 and lever 170 permitting the pump 132 to discharge fluid at a certain rate and such as to rotate the motor 118, for example, in the direction shown by the arrow in FIG. 2. The motor output shaft 120 is drivingly connected through a clutch 218 to a gear 220 which is engaged to a gear 178 fixed on the screw 168 for rotation therewith, as shown in FIGS. 2 and 6.

Rotation of the motor 118 resulting from movement of the pump control valve regulating flow of the driving fluid to the motor will thus effect rotation of the screw 168 through the gears 220, 178 such that the screw will thread itself in the nut 166, for example, to move to the left, as viewed in FIG. 6, and therefore tend to restore the lever 170 and control valve 173 to their original or neutral position. In this respect, it will be noted that gear 220 is thicker than gear 178 whereby the latter may move axially with screw 168 to a limited extent while still in driving connection with gear 220. The lever 170 and control valve 173 will be restored to their neutral position unless further movement of the cam path on the roll cam 162 permits further movement of the nut 166, resulting in a command for continuous discharge from the pump to the motor.

The pump and motor will both preferably be of the positive displacement type, in the illustrative embodiment, and thus it will be seen that a given rise or fall of the cam surface 196 will produce a corresponding fixed number of turns of the motor, and the established rise of the cam surface 196 will produce a fixed number of turns each way of the shaft 120 per tooth-cutting cycle.

In operation, therefore, while the roll cam 162 is continuously turning, the roller 164 will be reciprocated back and forth between its limit positions. During such straight line motion of the cam roller, the slide, nut and screw will be moved bodily as a unit, in a straight-line direction, and generally along the axis of the screw. Starting from the left-hand limit position of the cam follower, as would be viewed in FIG. 6, as the starting point, it will be noted that as the cam roller 164 is moved to the right there will be a corresponding movement of the actuator 214 for the valve lever 170. At this time, certain valves in the valve system 173 will be actuated, as will be described in more detail hereinbelow, and the flow of fluid into the hydraulic motor will be changed so that the gear 220 will rotate in the opposite direction to that shown in FIG. 2, and at a predetermined speed, so as to rotate the gear 178, rotation of which will cause the screw to be rotated and moved axially relative to the nut 166. This axial movement of the screw normally will be in the opposite direction from that just previously effected by the movement of the cam follower 164 to the right. It is this compound axial and rotary motion of the screw 168 caused by the feedback rotation through gears 220, 222 which enables the screw to have a considerably shorter travel axially than the travel of the cam follower 164 and nut 166.

It might be noted that the screw 168 will rotate, in the illustrative embodiment of the invention, in one direction for one cutting stroke, for example, the downroll, and it will rotate in the opposite direction for the other cutting stroke, for example, the uproll. Thus, during normal machine operation, the lead screw will be rotating virtually continuously, except for those times when its direction of rotation is being reversed, and the cam follower 164, slide 186 and nut 166 will be reciprocated back and forth, so that the screw itself will undergo a compound motion, part rotational and part axial. As will be understood, the rate of rotation of the screw 168 itself is not necessarily constant during either the uproll or the downroll. For example, in certain roughing operations, the screw will be rotated at different speeds corresponding to the different speeds of roll during the cutting stroke.

It will be understood that selection of the appropriate roll change gears 122 and 124 produces from the fixed number of turns of the shaft 120 a desired angle of turning in the work spindle, as required to fully generate one tooth contour. Selection of the ratio of roll gears 58, 60, 62 and 64 in the generating train will produce the proper proportionate angle of cradle turning, as will be apparent. Thus, by suitable choice of these roll change gears, just mentioned, the desired amount of roll for the work spindle and cradle can be predetermined, for example, depending upon the requirements of a particular cutting operation and cycle. However, the present development also contemplates a separate and novel means for effecting a change in this ratio of roll between the cradle and work spindle during operation so as to produce a different ratio of roll in one direction of roll than in the other direction of roll, as may be desired for certain cutting operations, for example, in the generation of spiral or hypoid pinion gears. This means for changing the ratio of roll, separate from the roll change gears mentioned above, is more fully disclosed and claimed in the copending application Ser. No. 764,214.

The feed cam 156, operating from the main cam shaft 154 for cycle control, preferably is arranged to actuate the cradle 32 axially into and out of generating position with the work, and this will take place once per tooth-cutting cycle. The structure for effecting this axial movement of the cradle is disclosed and claimed in the copending application Ser. No. 764,222. There are safety features for the nut and screw differential 166, 168 of the servomechanism, in the event of any unexpected or undesired shutdown, for example, in the hydraulic circuit for the motor 118. These safety features include the compression spring 204 and shoe 208 arranged in the bore 206 of the screw, as described above. In the event of some shutdown, particularly if the shaft 120 and feedback gear 220 are not rotating as desired, there would not be the proper feedback motion through the gear 178 to give the desired motion of the screw tending to return it to its previous position. Such a problem could arise during a feeding motion of the cam follower and screw 168 to the right, as shown in FIG. 6, and if there is no proper feedback to the gear 178, the cam follower 164 might otherwise move the screw 168 further to the right and perhaps cause some damage or breakage. However, in the present arrangement, if the feedback gear 220 is not properly rotating at the proper time, and the screw is still being urged to move axially to the right, then it will continue such movement to the right under the action of the rising cam surface 196 and follower 164 until the ball detent 200 at the left-hand end of the slide 186 is forced out of driving engagement with the nut 166, thereby permitting the slide 186 to continue its movement to the right while the nut 166 and screw 168 will remain stationary. (In this connection, it will be noted that the screw 168 and slide 186 are constructed and arranged so as to permit relative axial and rotational movement therebetween). For effecting this action of the safety release of the ball detent 200, the compression spring 204 and the spring for the ball detent 200 and other structures may be so designed that movement to the right of screw 168 beyond the normal limit for such movement will result in a limited movement of the valve actuator 214 and lever 170 (as by having some suitable stop surface means limiting such movement of these parts), whereupon further movement of the screw 168 to the right (as viewed in FIG. 6) will result in a further compression of the spring 204 until such time that the ball detent 200 is released. In any event, it will be understood that the arrangement will be such that the ball detent 200 will be released before the screw 168 moves to the right beyond the ultimate safe point for such movement.

There is also provided a limit safety switch 224, as shown in FIG. 4, to be actuated in the event of excessive axial movement of the screw 168. This limit switch is shown as being operated by an actuating rod 226 extending into an annular recess 228 at the left-hand end of the screw 168, as shown in FIGS. 4 and 6. The axial distance between the tapered shoulders of this recess 228 will correspond to the normal range of travel of the screw and the switch will be actuated if that normal range is exceeded, as will be evident. The switch 224 in the illustrative embodiment is designed to effect instantaneous shutdown of the machine when actuated. The other safety features described above would provide the immediate response needed to prevent damage or breakage in the nut and screw differential, whereas the limit safety switch 224 would operate to shut down the machine.

Referring now to FIGS. 4 and 6, the clutch arrangement 218, referred to above, will now be described in more detail. This clutch is designed to enable the hydraulic motor 118 and shaft 120 to be operated without driving the feedback gear 220. Such action may be desirable, for example, during an adjustment of the cradle 32. The clutch is shown as including a sleeve 230 suitably drivingly connected to the shaft 120, as by a slidable driving key arrangement (not shown), permitting axial movement of the sleeve on the shaft. A spring-urged ball detent 232 is shown in FIG. 6 as being arranged in the shaft 120 and extending into a blind hole in the sleeve 230 to releasably hold the clutch sleeve 230 in releasable driving connection to the gear 220.

Gear 220 may be suitably drivingly connected to the sleeve 230, as by face-coupling lugs 231 engaged in corresponding slots in the sleeve. Normally these parts will be in driving engagement, as will be evident. A clutch-operating lever 234 is shown as including a lug 236 arranged in an annular circumferential groove 238 in the sleeve 230 for operating the clutch between its engaged and disengaged positions, wherein the sleeve 230 is moved axially of shaft 120 to release or engage the ball detent 232 and the coupling lugs 231, as will be understood.

It should be noted that when it is desired to move or rotate the cradle for some reason, apart from a cutting operation, it would not be desired to have the nut and screw differential 166, 168 of the servomechanism 136 operated. It will be noted that the servomechanism will be initially adjusted during setup of the machine to provide a certain cradle movement desired for the particular cutting operation to be performed. However, it may also be desired during setup to move the cradle to different positions for various reasons, for example, so as to render accessible certain parts that may need attention during setup, as will be understood. During or for such cradle adjustments, the clutch 218 will be disengaged from the feedback gear 220 and the hydraulic pump 134 will be actuated, for example, by a manual lever (not shown) until the cradle has been rotated to the desired position. Thus, the clutch arrangement 218 will enable the cradle to be moved as desired, during initial setup or for other reasons, without disturbing the previous adjustments initially set up in the servo-control mechanism 136 (FIG. 2). Once these desired adjustments or operations have been performed following this cradle movement or rotation beyond its normal range during the contemplated cutting operation, the cradle may be rotated back to its initial position, and the servomechanism 136 will then be still in condition to operate according to its previous adjustment, when the cutting cycle begins.

VALVE ARRANGEMENT FOR THE PUMP

A suitable valve construction to be utilized in the valve system 173 for controlling the operation of the hydraulic pump 132 is shown in FIG. 7. As shown in that FIG., the actuator 214 is suitably connected to the valve lever 170 which is pivoted at one end 240 thereof and free at the other end 172 thereof where it engages a pilot valve spool 242 slidably arranged in a sleeve 244 suitably slidably mounted in the machine, for example, as illustrated. The spool 242 is shown as including two valve heads or collars 246, 248 thereon. Sleeve 244 has threaded in its right-hand end, as viewed in FIG. 7, a yoke member 254 designed to move therewith. Inside the yoke member and to the left, as seen in FIG. 7, there is a compression spring 256 arranged to abut against the inside of the yoke at one end and against the inside or right-hand end of the spool at the other end. A stop 258 is provided extending in from the sleeve 244, at the left-hand end thereof, into an annular recess in the spool between collars 246, 248, as shown, to prevent the larger spool from sliding out of the sleeve. The larger intermediate annular recess in the spool between collars 246, 248 is designed to be in selective fluid communication with four fluid ports 260, 262, 264, 266, conveniently arranged in aligned pairs of two, and with port 264 plugged, as indicated. Inlet port 260 is arranged to continuously receive fluid pressure. In the position of the spool shown in the drawing, the inlet port 260 is opened to the annular recess, and the outlet port 266 is closed. The port 262 opposite the inlet 260 is arranged there for convenience, and will transmit fluid pressure to a piston 272 by a suitable fluid line (indicated at 273) connected to a port 274 opening into the cylinder 276 containing the piston 272.

During operation of the servomechanism, when the actuating lever 170 is pivoted from its neutral position and counterclockwise about axis 240, as viewed in FIG. 7, port 266 will be open so that some fluid pressure will now flow through another fluid line (indicated at 267) to inlet port 278 of cylinder 280 to urge the piston 282 therein upwardly against a bellcrank lever 284 (the head of piston 282 being of larger pressure area than piston 272 to produce such movement). This causes the bellcrank lever 284 to undergo a counterclockwise rotation about its axis 286, as viewed in FIG. 7. This rotation, in turn, will cause the yoke 254 at the end of the sleeve to move to the right because of its connection with the end 288 of the bellcrank lever, and such movement of the yoke will also carry with it the sleeve 244, which will then be moved to a position once again closing off the port 266. Connected to the center of the bellcrank lever 284, and below it as shown in FIG. 7, is a conventional wobble plate valve arrangement (not shown) for the variable displacement, reversible pump 132. The wobble plate preferably will be suitably drivingly connected to the bellcrank lever so as to be rotatable about the pivotal axis 286 with the bellcrank lever and it will be in a plane including that axis, as will be understood. Thus, when the piston 282 is actuated, the bellcrank lever will rotate counterclockwise, as discussed above, and this will cause a corresponding rotation of the wobble plate, and fluid will then be pumped to the hydraulic motor 118 causing operation thereof. This in turn will normally rotate the feedback gear 178 and cause the valve-actuating rod 214 to be moved back to the left, as viewed in FIG. 7. This latter motion will cause the valve spool 242 to undergo a corresponding return motion to the left under the action of the spring 256, and this will put the fluid port 266 on to exhaust through port 290 as indicated in the drawing, to relieve the pressure in the cylinder 280. When this exhaust takes place, piston 272 will now take over and cause the bellcrank lever 284 to rotate in the opposite or clockwise direction, producing a movement of the sleeve 244 to the left, as viewed in FIG. 7, and also causing a rotation in the clockwise direction, as viewed in FIG. 7, of the wobble plate so as to change the speed of operation of the hydraulic motor and its shaft and the feedback gear 220. Motion of the sleeve to the left will again bring fluid port 266 into a closed position with the corresponding annular closing collar 250 of the spool 242.

As will be understood, there will be a neutral position for the pistons 272, 282 wherein the wobble plate will be in a neutral position and the motor 118 will not be operating. Thus, the operation of the pump 132 may be continuous, and movement of the valve-actuating member 214 from its neutral position and to the right, as viewed in FIG. 7, will cause the wobble plate (not shown) to pivot in a counterclockwise direction, as viewed in that FIG., resulting in rotation of the hydraulic motor in one direction, while movement of the valve actuator from its neutral position and to the left, as viewed in FIG. 7, will effect a reverse rotation of the wobble plate, resulting in a reverse rotation of the motor. It should be noted that if the roll cam reaches a point where it indicates a change in the rate or speed of roll, this will be reflected by a change in the position of the wobble plate.

ROLL-CENTERING DEVICE

As will be understood, at the end of any given cutting cycle for a particular workpiece, there may be some movement of the roll cam 162 beyond the position it would have been in if it had come to an instantaneous stop. The amount of this carryover motion may not always be the same, nor can it always be predetermined.

In the present development, referred to above, it is contemplated that the work may be automatically loaded and unloaded in the work spindle. The associated automatic loading and unloading mechanisms perform automatically the function of consistent angular space orientation of the work. Accordingly it is essential that for the loading operation the cradle and work spindle which are geared for rotation together be brought to a consistent and very precise angular space orientation. This is accomplished in the present invention by a novel roll-centering device. The term "roll-centering" does not necessarily mean that this action will take place at the center of roll, as it can be arranged that this means for consistent cradle and work spindle space orientation occur at any desired position in the roll range.

In the illustrative embodiment of the roll-centering device, as best seen in FIGS. 4 and 6, there is provided a flange 292 drivingly connected to a gear 294 spaced coaxially therefrom and both drivingly connected to shaft 296 leading into the ratio control mechanism 188 (shown in FIG. 2 and described in copending application Ser. No. 764,214). Gear 294 and flange 292 are connected by structure suitably journaled in the machine, as shown in FIG. 6. The flange 292 is shown provided with a dog 298 extending outwardly therefrom, and the flange and dog will stop, at the end of a cutting cycle, within a certain limited range of stop positions, as will be understood. A dog stop 300 is arranged adjacent the dog 298, and normally out of its path of movement. Stop 300 may be provided by the outer extremity of a piston 302 arranged for reciprocation within a cylinder 304 suitably mounted in the machine frame, in the position shown. The piston 302 will normally be held in the retracted position thereof shown in FIG. 6 by the compression spring 306, and is designed when put under pressure to be projected through the outer cap member 308 and into a position in the path of movement of the dog 298 adjacent its limited range of stop positions. Fluid pressure may be introduced into the cylinder 304 through the inlet port 310 at the left-hand end thereof.

When the piston is so actuated by fluid pressure, and moves to the right, as shown in FIG. 6, it also actuates a bellcrank lever 312, shown as being connected by a pin and slot arrangement 314 to a projection 316 extending from the pistonhead through the closure cap 318 on the cylinder. A roller 320 is disposed at the other free end of the bellcrank lever, as shown, and when the piston is actuated by fluid pressure to move to the right, the bellcrank lever will be pivoted in a clockwise direction so that the roller 320 will engage an inclined surface 322 on a plate cam 324 which is fixed or attached to the slide 186 of the servomechanism, in a suitable manner. Thus, when the roller 320 so engages the plate cam 324, it moves the latter to the right as viewed in FIG. 6, and this movement of the plate cam drives the slide 186 and screw 168 to the right, thus operating the valve system 173 through the actuator 214 to start the hydraulic motor and rotate the gears 220, 294 and flange 292 until the dog 298 strikes the dog stop 300, thus providing for a fixed, predeterminable position for the cradle and work spindle.

The axial movement of the slide 186 and screw 168 of the servomechanism will thus cause the cam follower 164 of the slide 186 to move slightly off the roll cam 162, and the cam follower will stay in that position until the pressure is released from the cylinder 304 for the piston 302, at which time the spring 306 in the cylinder will return the piston 302 to its retracted position to the left, and the bellcrank lever 312 associated therewith will be rotated counterclockwise, as viewed in FIG. 6, so that its cam follower 320 will be moved out of the way of the plate cam 324. At this time the spring 174 on the valve actuator 214 will return the slide, nut and screw assembly 166, 168 back to the position wherein the cam follower 164 on the slide will again be in engagement with the roll cam 162.

It will be understood that while the dog 298 on the flange 292 is in engagement with the dog stop, the work may be unloaded and moved to a new station, while additional work may be moved into loading position in a predetermined and desired position for the next cutting operation and suitable means may be provided for indicating that the dog 298 has engaged the stop 300. For example, an air readout port 311 is shown extending through cap 318 into fluid communication with a passageway 315 in the piston 302 and terminating in an outlet 317 in the dog stop 300, as shown in FIG. 6. Thus, when the dog engages the stop, the design is such that the dog blocks off the outlet 317 and this provides a suitable signal that roll-centering has been effected.

RELIEF VALVE ARRANGEMENT FOR ROLL-CENTERING

FIG. 9 illustrates a relief valve construction 326 designed to be utilized in the fluid flow circuit shown in FIG. 8 as connecting the pump 132 to the motor 118. The relief valve is arranged in the fluid flow circuit as shown in FIG. 8, and in the illustrative embodiment thereof, it is designed normally to vent at a certain pressure (for example, approximately 900 p.s.i.). However, during a roll-centering operation, when dog 298 (FIG. 6) is being moved with its flange 292 to the position where the dog contacts stop 300, the usual full force of the hydraulic pump might result in damage to these relatively frail parts, and so it is quite desirable to reduce driving pressures for this roll-centering operation. Therefore, certain novel structure has been added to relief valve 326 to cause it to vent at a reduced pressure (for example, approximately 300 p.s.i.) during roll-centering. That is, hydraulic pressure is present in hydraulic motor 118 when dog 298 engages its stop 300, but the hydraulic motor will not be able to turn because of the engagement of the dog 298 with the stop 300, and so it is desired at that time to vent the hydraulic pressure through the relief valve at a lower level than the venting pressure for normal operation.

The right-hand portion of the structure of relief valve 326, and as shown in FIG. 9, may be conventional, as will be understood, with spring 330 being adjusted so that valve 336 will unseat when fluid under pressure in excess of 900 pounds is received through inlet port 334'. The structure of the left-hand portion of relief valve 326 is designed to provide for a reduced or lowered venting pressure during roll-centering operations, and it includes a piston 332 designed to be moved to the right under the influence of pressure coming into an auxiliary inlet port 328. Piston 332 in turn acts against a slidable rod member 334 and urges the latter to the right against the spring 330. Preferably, auxiliary port 328 is connected to the line 342 which feeds hydraulic pressure from a second source 344 to the cylinder 304 to move dogstop 300 into the path of dog 298 during the roll-centering operation as described above. Thus, at the end of a cutting cycle, hydraulic fluid pressure may be transmitted both to the cylinder 304 or the dogstop piston, and at the same time to auxiliary inlet port 328 where it operates against piston 332 and compression spring 230 to effect a lowering of the valve's normal venting or relief pressure. Therefore, it will be appreciated that, if the equivalent of approximately 600 pounds of pressure is introduced at auxiliary inlet port 328 to act on spring 330, a mainline pressure in excess of about 300 p.s.i. coming into port 334' will unseat valve 336 and vent through the exhaust port 338, thereby providing the desired reduction in motor drive pressure during the roll-centering operation.

INCREASE IN PRODUCTION

One of the reasons for the increase in production provided by the present invention is that the cutter may now be operated at a much higher speed, as indicated above. This is possible because, among other things, the cutter drive and gearing have been separated entirely from the generating train, and a novel structural orientation of tool and work holders and supporting structures has been provided to withstand the higher cutting speeds. Furthermore the control means for the generating train is separate from it and is operated by its own independent power source, while the generating train has its own separate power source. This also enables the generating train to operate at higher speeds so as to accomodate the faster cutting cycle. In typical previous machines, the means for controlling the operation of the generating train actually drove the generating train itself, as disclosed, for example, in U.S. Pat. No. 2,667,818. While such structures were and still are satisfactory for commercial production, the present development is designed to constitute an improvement thereover by providing for an even higher production rate.

It thus will be seen that the objects of this invention have been fully and effectively accomplished. It will be realized, however, that the foregoing specific embodiment has been shown and described only for the purpose of illustrating the principles of this invention and is subject to extensive change without departure from such principles. Therefore, this invention includes all modifications encompassed within the spirit and scope of the following claims.

We claim:

1. In a bevel gear-generating machine having a work spindle and a tool support mounted on a rotary member, the combination comprising: a generating train connecting the work spindle and the rotary member for relative rotation about their respective rotation axes; a power operated mechanism connected to the generating train for driving the latter reversingly; and a servomechanism including a rotatable power-driven cam actuated by a separate power source, a cam follower driven reversingly thereby, and a control for said mechanism having a differential connection with said cam follower and with said generating train for operation differentially by them.

2. A machine according to claim 1 in which said mechanism comprises a hydraulic pump and a reversing hydraulic motor driven by the output of the pump, the motor being connected to the generating train for driving the latter, and said control is movable to reverse and to vary the volumetric output of the pump directed to the motor.

3. A machine according to claim 2 in which the pump and the motor are both of the positive displacement type, and said control means is arranged to control the direction and the volume of fluid displacement of the pump.

4. A machine according to claim 3 in which said control comprises a hydraulic actuator arranged to effect said control of the pump and a control valve for said actuator, and said differential connection is a connection of said valve to the cam follower and the generating train.

5. A machine according to claim 4 in which said connection comprises a nut and screw, one of which is nonrotatable and is connected with the cam follower for axial motion thereby, and the other of which is connected to the generating train for rotation thereby and is movable axially to actuate said valve.

6. A machine according to claim 1 in which said differential connection comprises a nut and screw, one of which is nonrotatable and is connected with the cam follower for axial displacement thereby, and the other of which is connected to the generating train for rotation thereby and is movable axially to actuate said valve.

7. A machine according to claim 6 and further including means for releasably drivingly connecting the cam follower to the nut.

8. A machine according to claim 1 in which there is a feed cam for effecting relative infeed and withdrawal motions between the work spindle and the tool support in the direction of the rotation axis of the rotary member, and the feed cam and said power-driven cam are coaxial and corotatable.

9. A machine according to claim 1 in which there is an intermittent indexing mechanism for the work spindle connected to the generating train through differential gearing, and said power operated mechanism is connected to the generating train between the differential gearing and the ratio change means.

10. A machine as defined in claim 1 wherein means are provided for disengaging the differential connection from the generating train in the event the latter fails to operate in response to a demand therefor indicated by said control means.

11. A bevel gear-generating machine having a work spindle and a tool support, one of which is mounted on a rotary member, a generating train connecting the work spindle and the rotary member for relative rotations about their respective rotation axes, a power-operated mechanism connected to the generating train for driving the latter reversingly, control means for said mechanism including a power-driven first member and a second member operatively connected to said first member to be driven thereby, and said control means further including differential means operatively connecting said second member with said generating train for differential operation by said generating train and said first member.

12. The structure as defined in claim 11 wherein said generating train and said control means are each provided with separate power sources.

13. The structure defined in claim 11 wherein said generating train includes a clutch means to selectively engage or disengage the differential means from said generating train.

14. The structure defined in claim 11 and further including roll-centering means drivingly connected to said generating train and including means for operating said power-operated mechanism independently of said first member.

15. The structure defined in claim 14 wherein said means for operating said mechanism independently of said first member operates through said differential connection.

16. The structure defined in claim 14 wherein said power-operated mechanism includes a hydraulic pump and motor arranged in a hydraulic circuit, and further including a relief valve in said circuit with means in said valve adapting it to vent at a lower pressure during roll-centering than during normal cutting operations.

17. The structure as defined in claim 11 wherein means are provided for disengaging the differential means from the generating train in the event the latter fails to operate in response to a demand therefor as indicated by the control means.

18. The structure as defined in claim 11 and further including means for releasably drivingly connecting said second member to said differential means.

19. A gear-cutting machine comprising a rotary cradle carrying a rotary tool holder, a rotary work holder, a generating gear train for effecting a rolling action between said cradle and said work holder for a generating cutting action, a first power source for said generating train, a control means separate from said generating train and operatively connected to said first power source for regulating operation thereof, a second power source for said control means.

20. The structure defined in claim 19 and including a third power source operatively connected to drive said tool holder.

21. The structure defined in claim 19 wherein said control means includes a differential drive, said differential drive being operatively connected to said second power source and said generating train for differential operation thereby.

22. The structure defined in claim 21 and further including a third power source operatively connected to drive said tool holder.

23. The structure defined in claim 21 wherein actuator means are provided for said first power source, and wherein said differential drive includes means operatively connected to said actuator means to control operation of said first power source.

24. The structure defined in claim 23 and further including a third power source operatively connected to drive said tool holder.

25. The structure defined in claim 19 wherein said control means includes a servomechanism having actuator means operatively connected to said first power source for controlling the effect of that latter power source on said generating train.

26. The structure defined in claim 25 and further including a third power source operatively connected to drive said tool holder.

27. The structure defined in claim 25 wherein said first power source includes a hydraulic motor and a hydraulic pump connected thereto to drive the motor in reverse directions, and said control means controlling the effect of said pump on said motor.

28. The structure as defined in claim 27 and further including a third power source operatively connected to drive said tool holder.

29. In a bevel gear-generating machine having a rotatable work spindle and a rotatable cradle, a generating train connecting the work spindle and the cradle for relative rotations about their respective axes of rotation, a power source connected to said generating train for driving the latter reversingly, and a control means for said generating train, the improvement which comprises: a roll-centering device for bringing the work spindle and cradle to a consistent angular space orientation at the end of a cutting cycle, said device including first means operably connectible to said control means to effect further rotation of said generating train after the end of a cutting cycle, and second means for limiting this further rotation of said generating train so that it will always be in a predetermined position after the end of a cutting cycle.

30. The structure defined in claim 29 wherein said first means includes pressure actuated means normally out of operable engagement with said control means but operable when said pressure-actuated means is activated to operably engage said control means for actuation of said power source.

31. The structure defined in claim 30 wherein said second means includes a stop member and rotatable member, the latter being drivingly connected to said power source to be driven simultaneously with the generating train, and said rotatable member including a dog means adapted for engagement to said stop member, said stop member normally being out of the path of movement of said dog means, and means for relatively moving said stop member and said dog means so that said stop member is in the path of movement of said dog means during roll-centering operations.

32. The structure defined in claim 31 wherein said pressure-actuated means includes said means for relatively moving said stop member and said dog means.

33. The structure defined in claim 32 wherein said pressure-actuated means include a piston slidably arranged in a fluid chamber and projecting outwardly therefrom at either direction, and further wherein said first means includes a bell-crank lever connected at one end thereof to one end of said piston and the other end of said lever being movable into operative engagement with said control means to actuate the latter when said piston is moved in one direction.

34. The structure defined in claim 33 wherein said stop member is carried by the other end of said piston and is movable into the path of said dog member when said piston is moved in said one direction.

35. The structure defined in claim 29 wherein said power source includes a hydraulic motor, a hydraulic pump, a fluid circuit interconnecting them, and a relief valve in said circuit designed for a first venting pressure, the further improvement which comprises means in said relief valve and operable during said roll-centering operations to lower the venting pressure of said valve during load-centering operations.

36. The structure defined in claim 35 wherein said valve means includes a spring-loaded normally closed valve, a passageway coming into said valve from said fluid circuit and on one side of said valve, a venting port in said valve means on the other side of said valve, and a pressure-actuated member in said valve means and movable against said valve to put additional pressure thereon during roll-centering operations.